(12) United States Patent
Komai et al.

(10) Patent No.: US 11,811,667 B2
(45) Date of Patent: Nov. 7, 2023

(54) PREDICTION APPARATUS, PREDICTION METHOD AND PROGRAM

(71) Applicant: NIPPON TELEGRAPH AND TELEPHONE CORPORATION, Tokyo (JP)

(72) Inventors: Yuka Komai, Musashino (JP); Masahiro Kobayashi, Musashino (JP); Shigeaki Harada, Musashino (JP); Tatsuaki Kimura, Osaka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 253 days.

(21) Appl. No.: 17/310,473

(22) PCT Filed: Feb. 7, 2020

(86) PCT No.: PCT/JP2020/004785
§ 371 (c)(1),
(2) Date: Aug. 5, 2021

(87) PCT Pub. No.: WO2020/170852
PCT Pub. Date: Aug. 27, 2020

(65) Prior Publication Data
US 2022/0158945 A1 May 19, 2022

(30) Foreign Application Priority Data
Feb. 19, 2019 (JP) .................................. 2019-027720

(51) Int. Cl.
*H04L 47/2408* (2022.01)
*H04L 47/2441* (2022.01)
*H04L 47/2475* (2022.01)

(52) U.S. Cl.
CPC ...... *H04L 47/2408* (2013.01); *H04L 47/2441* (2013.01); *H04L 47/2475* (2013.01)

(58) Field of Classification Search
CPC ............. H04L 47/2408; H04L 47/2441; H04L 47/2475; H04L 45/04; H04L 45/74
See application file for complete search history.

(56) References Cited

U.S. PATENT DOCUMENTS

| | | | | |
|---|---|---|---|---|
| 2020/0120131 | A1* | 4/2020 | Soni | G06N 20/00 |
| 2021/0135997 | A1* | 5/2021 | Tigli | H04L 41/145 |
| 2021/0160147 | A1* | 5/2021 | Chou | H04L 41/5025 |

FOREIGN PATENT DOCUMENTS

JP 5747393 7/2015

* cited by examiner

*Primary Examiner* — Wutchung Chu
*Assistant Examiner* — Najeeb Ansari
(74) *Attorney, Agent, or Firm* — IPUSA, PLLC

(57) ABSTRACT

A prediction apparatus includes, a first calculation unit configured to calculate, for traffic in a past time period between a plurality of users and a plurality of services, statistics of the traffic in units of combinations of the users, the services, and time zones, an extraction unit configured to extract, based on the statistics, a plurality of patterns from the traffic, a classification unit configured to classify, by pattern, at least one of each user or each service into groups, a second calculation unit configured to calculate, based on the classification result from the classification unit and the statistics, per-time-zone statistics for each group, and a third calculation unit configured to apply a prediction technique to the per-time-zone statistics for each group, to calculate, for each group, a prediction value of the statistics for a time period later than the past time period, resulting improved accuracy of traffic prediction.

4 Claims, 14 Drawing Sheets

| TIMESTAMP | USER ID | SERVICE NAME | (OBSERVED VALUE) |

Fig. 4

| TWO-DIMENSIONAL ARRAY A | TIME ZONE 1 | TIME ZONE 2 | ... | TIME ZONE a |
|---|---|---|---|---|
| PATTERN 1 | 0.8 | 0.4 | ... | 0.1 |
| PATTERN 2 | 0.1 | 0.1 | ... | 0.9 |
| ... | ... | ... | ... | ... |
| PATTERN k | 0.5 | 0.7 | ... | 0.2 |

| TWO-DIMENSIONAL ARRAY B | SERVICE 1 | SERVICE 2 | ... | SERVICE n |
|---|---|---|---|---|
| PATTERN 1 | 2.4 | 0.4 | ... | 0.1 |
| PATTERN 2 | 0.5 | 0.1 | ... | 1.6 |
| ... | ... | ... | ... | ... |
| PATTERN k | 0.2 | 1.2 | ... | 0.2 |

| TWO-DIMENSIONAL ARRAY C | USER ID1 | USER ID2 | ... | USER IDm |
|---|---|---|---|---|
| PATTERN 1 | 0.8 | 1.4 | ... | 0.1 |
| PATTERN 2 | 2.1 | 0.1 | ... | 0.3 |
| ... | ... | ... | ... | ... |
| PATTERN k | 0.1 | 0.6 | ... | 1.5 |

Fig. 9

| | SERVICE 1 | SERVICE 2 | ... | SERVICE n |
|---|---|---|---|---|
| GROUP 1 | 1 | 0 | ... | 0 |
| GROUP 2 | 0 | 0 | ... | 1 |
| ... | ... | ... | ... | ... |
| GROUP k | 0 | 1 | ... | 0 |

TWO-DIMENSIONAL ARRAY Bg

| | USER ID1 | USER ID2 | ... | USER IDm |
|---|---|---|---|---|
| GROUP 1 | 0 | 1 | ... | 0 |
| GROUP 2 | 1 | 0 | ... | 0 |
| ... | ... | ... | ... | ... |
| GROUP k | 0 | 0 | ... | 1 |

TWO-DIMENSIONAL ARRAY Cg

Fig. 10

| | TIME ZONE 1 | TIME ZONE 2 | ... | TIME ZONE a |
|---|---|---|---|---|
| GROUP 1 | 128 | 48 | ... | 24 |
| GROUP 2 | 128 | 24 | ... | 2048 |
| ... | ... | ... | ... | ... |
| GROUP k | 512 | 1024 | ... | 128 |

TWO-DIMENSIONAL ARRAY Ag

Fig. 11

| OUTPUT RESULT A' | TIME ZONE a + 1 | TIME ZONE a + 2 | ... | TIME ZONE a + a' |
|---|---|---|---|---|
| GROUP 1 | 2048 | 48 | ... | 24 |
| GROUP 2 | 128 | 24 | ... | 1024 |
| ... | ... | ... | ... | ... |
| GROUP k | 512 | 1024 | ... | 256 |

Fig. 12

| OUTPUT RESULT A' | TIME ZONE a + 1 | TIME ZONE a + 2 | ... | TIME ZONE a + a' |
|---|---|---|---|---|
| GROUP 1 | 2048 | 48 | ... | 24 |
| GROUP 2 | 128 | 24 | ... | 1024 |
| ... | ... | ... | ... | ... |
| GROUP k | 512 | 1024 | ... | 256 |

| TWO-DIMENSIONAL ARRAY Bg | SERVICE 1 | SERVICE 2 | ... | SERVICE n |
|---|---|---|---|---|
| GROUP 1 | 1 | 0 | ... | 0 |
| GROUP 2 | 0 | 0 | ... | 1 |
| ... | ... | ... | ... | ... |
| GROUP k | 0 | 1 | ... | 0 |

| TWO-DIMENSIONAL ARRAY Cg | USER ID1 | USER ID2 | ... | USER IDm |
|---|---|---|---|---|
| GROUP 1 | 0 | 1 | ... | 0 |
| GROUP 2 | 1 | 0 | ... | 0 |
| ... | ... | ... | ... | ... |
| GROUP k | 0 | 0 | ... | 1 |

Fig. 13

PREDICTION APPARATUS, PREDICTION METHOD AND PROGRAM

TECHNICAL FIELD

The present disclosure relates to a prediction apparatus, a prediction method, and a program.

BACKGROUND ART

Telecommunications carriers successively monitor network conditions and perform appropriately communication path control or equipment expansion to avoid degradation of communication quality due to network congestion.

On the other hand, in recent years, mobile terminals and Internet of Things (IoT) devices have become rapidly prevalent and numerous services are provided for such mobile terminals and IoT devices. Thus, communication quality that is needed (required communication quality) has also been diversified. As examples of diversity in required communication quality, there is a need for relay distribution services in which a huge amount of data is needed to be transmitted with a very low latency, while there is a need for services in which only a smaller amount of data transmission is needed and delay is acceptable, such as data collection from sensors that have been already installed.

To maintain high communication quality in a situation in which required communication quality is diversified, it is effective to control paths of traffic based on required communication quality. For example, in situations where congestion may occur, by diverting traffic of a service in which delay is acceptable, to a path for bypassing the link in which congestion may occur, communication qualities in other communications can be maintained.

To achieve path control as described above, it is necessary to predict traffic for each required communication quality. Here, the required communication quality is strongly dependent on a service and a terminal environment of a user (OS, terminal type, and the like). Different services require different required communication qualities. For example, the video service requires a wider bandwidth, while Social Networking Service (SNS) requires a narrower bandwidth. In addition, even in the same video service, required image quality is different between when viewed on a desktop terminal with a large screen and when viewed on a smartphone with a small screen. Thus, required communication quality varies depending on the terminal environment.

However, in predicting traffic depending on required communication quality, if traffic divided in units of services and users is used to perform traffic prediction, each traffic volume becomes small. As a result, traffic fluctuations becomes unstable, and this makes a fluctuation pattern (trend) difficult to determine. Thus, the prediction accuracy will decrease.

PTL1 discloses a technology for grouping traffic to improve accuracy of traffic prediction. According to PTL1, by grouping traffic so that the time-series fluctuation of traffic volume becomes small, ease of prediction (prediction accuracy) is increased, as illustrated in FIG. 1. The grouped and easily predictable traffic can be allocated to an optimal path based on a prediction value (for example, a path that can minimize link utilization between nodes and prevent congestion).

CITATION LIST

Patent Literature

PTL1: JP 5747393 B

SUMMARY OF THE INVENTION

Technical Problem

However, the grouping according to PTL1 focuses only on time-series fluctuations of traffic, and thus the grouped traffic contains traffics of services with different required communication qualities. Thus, it is not possible to achieve prediction and path control based on required communication quality.

The present invention has been made in view of the above points and an object of the present invention is to improve accuracy of traffic prediction.

Means for Solving the Problem

To solve the above-described problems, a prediction apparatus includes a first calculation unit configured to calculate, for traffic in a past time period between a plurality of users and a plurality of services, statistics of the traffic in units of combinations of the plurality of users, the plurality of services, and time zones, an extraction unit configured to extract, based on the statistics, a plurality of patterns from the traffic, a classification unit configured to classify, by each of the plurality of patterns, at least one of each of the plurality of users or each of the plurality of services into groups, a second calculation unit configured to calculate, based on the classification result from the classification unit and the statistics, per-time-zone statistics for each of the groups, and a third calculation unit configured to apply a prediction technique to the per-time-zone statistics for each of the groups, to calculate, for each of the groups, a prediction value of the statistics for a time period later than the past time period.

Effects of the Invention

Accuracy of traffic prediction can be improved.

BRIEF DESCRIPTION OF DRAWINGS

FIG. 4 is a diagram of a configuration example of a traffic log.

FIG. 9 is a chart of an example of output results of a pattern extraction technique.

FIG. 10 is a chart of an example of grouping traffic based on access patterns.

FIG. 11 is a chart of an example of calculation results of per-time-zone traffic volumes for each group.

FIG. 12 is a chart of an example of an output result A' of a prediction technique.

FIG. 13 is a chart of an example of an output of a processing result of the prediction apparatus 10.

DESCRIPTION OF EMBODIMENTS

Hereinafter, a first embodiment will be described with reference to the drawings. Note that meanings of terms used in the present embodiment are as follows.

Both of the terms "communication" and "traffic" are synonymous with "communication traffic", and refer to communication data that flows over a network.

"Access" refers to generation of communication for a service by a user.

"Service" refers to a service provided by a distributor of contents, and is a service provided by a content service provider via a server.

In the present embodiment, to group traffic based on required communication quality, similarity of access patterns based on tendency with respect to services, users, and times of access (time-series fluctuation of traffic) is taken into account. Required communication quality is strongly dependent on services and users. In particular, if there is similarity in use of services by users, it can be thought that required communication quality is similar. For example, similar access patterns, such as cases of frequently using search sites via a desktop terminal at an office in the daytime or cases of watching video using a mobile terminal at night, and required communication quality correlate to each other.

On the other hand, similarity is observed for services, users, and traffic time-series fluctuations. For example, there are services that tends to be utilized at the same time, users having similar preferences (tending to utilize similar services), and patterns in usage timing (life patterns, usage at regular intervals, etc.). Thus, by grouping traffic based on such similarity of access patterns, a traffic time-series fluctuation unique to a group can be determined. It is thought that, if a traffic time-series fluctuation unique to a group can be determined, traffic in units of group can be predicted with high accuracy.

Figure 1:
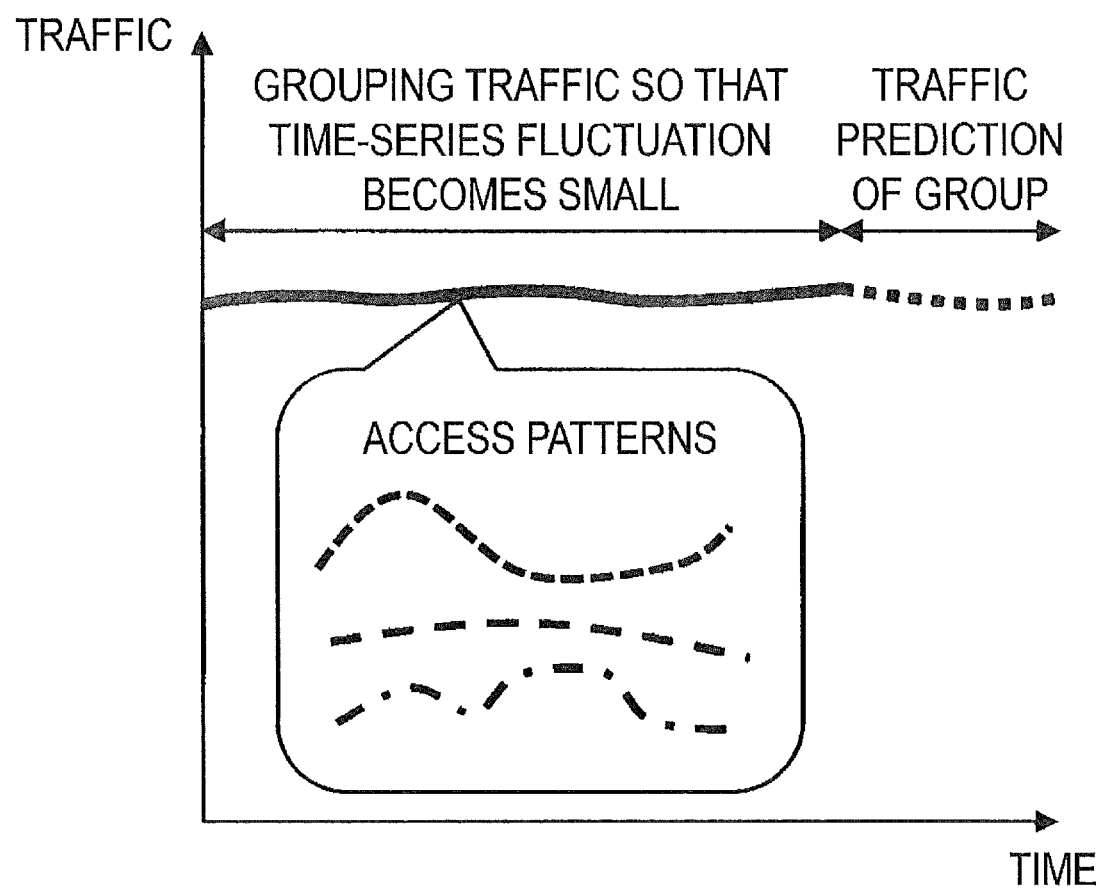
FIG. 1 is a diagram for explaining prediction by grouping traffic.
Figure 2:
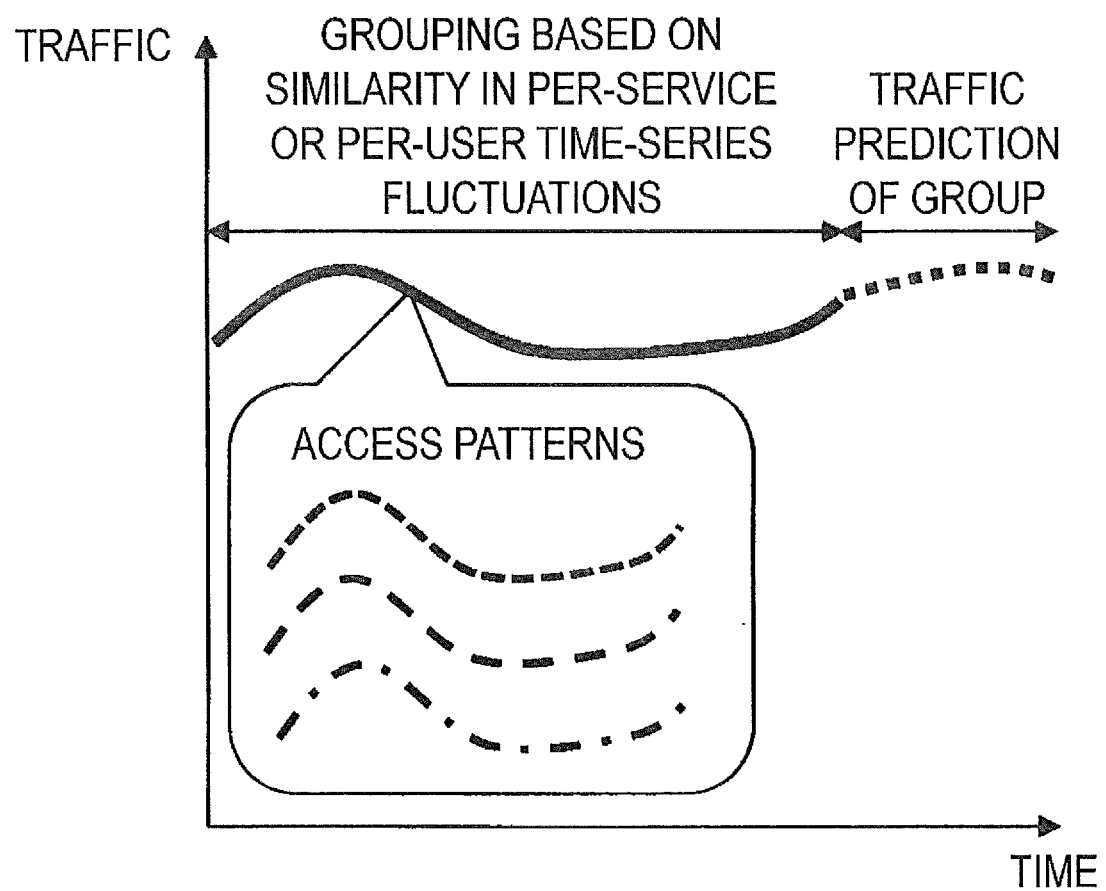
FIG. 2 is a diagram for explaining a traffic prediction method according to a first embodiment.

FIG. 2 is a diagram for explaining a traffic prediction method according to the first embodiment. As illustrated in FIG. 2, in the present embodiment, traffic is grouped based on the access patterns whose required communication quality is considered similar. Furthermore, in the present embodiment, highly accurate prediction and path control for traffic are performed in units of the groups. This allows for control in units of required communication qualities, which are not considered in existing approaches.

Figure 3:
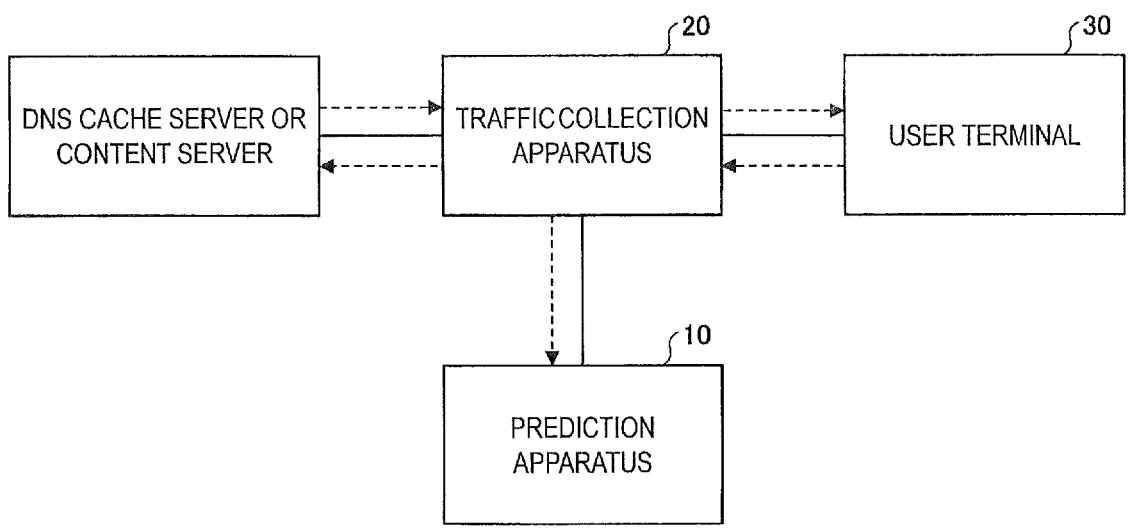
FIG. 3 is a diagram of an example of a system configuration according to the first embodiment.

FIG. 3 is a diagram of an example of a system configuration according to the first embodiment. In FIG. 3, a traffic collection apparatus 20 collects and accumulates logs of traffic (hereinafter referred to as a "traffic log") relating to access to services from a user terminal 30, while not affecting any communication between the networks. A recording destination of the traffic log may be a main memory or a recording device of the traffic collection apparatus 20, but not limited thereto.

A prediction apparatus 10 is one or more computers that predict, based on the traffic logs in a past time period collected by the traffic collection apparatus 20, traffic (traffic statistics) for a time period after the past time period.

FIG. 4 is a diagram of a configuration example of a traffic log. As illustrated in FIG. 4, the traffic log includes a timestamp, a user ID, a service name, an observed value, and the like.

The timestamp is the time at which the user terminal 30 has accessed the service. The user ID is an identifier (e.g., an IP address) of the user terminal 30 that has accessed the service. The service name is an identifier of the service of the access destination (DNS cache server or content server). Specifically, the service name is a hostname in the case of HTTP traffic and is a Fully Qualified Domain Name (FQDN) in the case of a DNS query, for example. The observed value is a traffic volume generated during the access to the service by the user terminal 30. However, the observed value is optional and the traffic log may not include the observed value.

Figure 5:
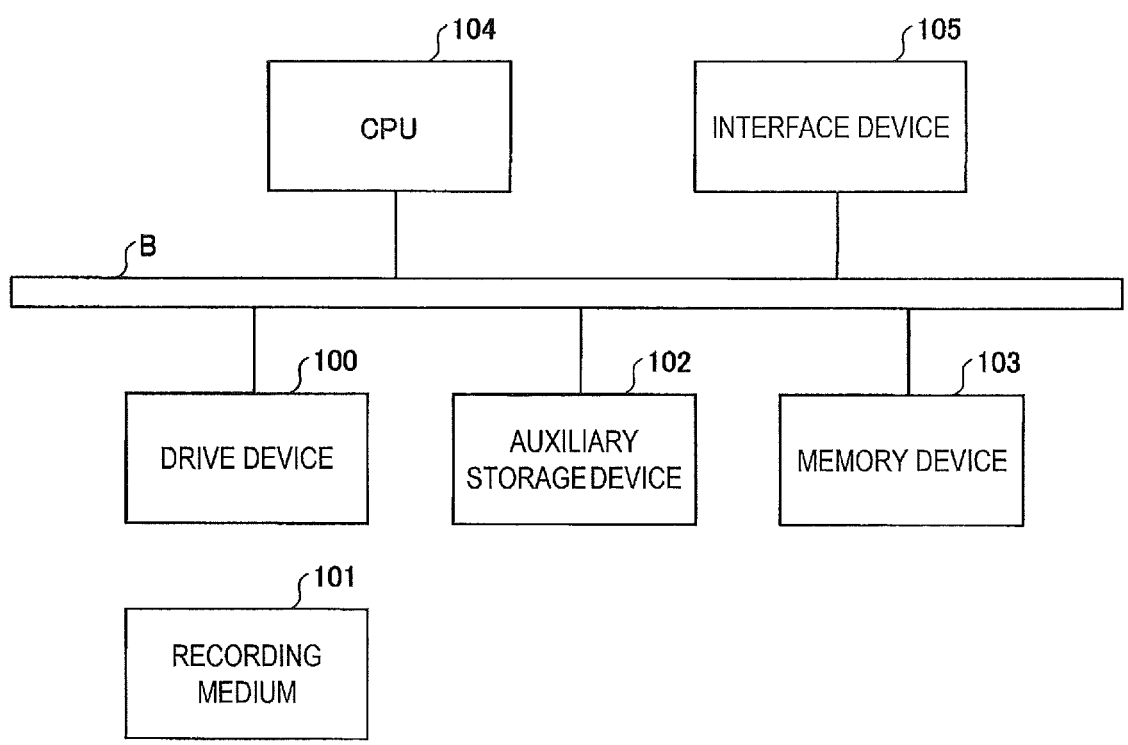
FIG. 5 is a diagram of an example of a hardware configuration of a prediction apparatus 10 according to the first embodiment.

FIG. 5 is a diagram of an example of a hardware configuration of the prediction apparatus 10 according to the first embodiment. The prediction apparatus 10 in FIG. 5 includes a drive device 100, an auxiliary storage device 102, a memory device 103, a CPU 104, an interface device 105, and the like which are connected to each other via a bus B.

A program that realizes processing of the prediction apparatus 10 is provided through a recording medium 101 such as a CD-ROM. When the recording medium 101 storing the program is set in the drive device 100, the program is installed on the auxiliary storage device 102 from the recording medium 101 through the drive device 100. However, the installation of the program does not necessarily need to be performed from the recording medium 101, and the program may be downloaded from another computer through a network. The auxiliary storage device 102 stores the installed program and also stores necessary files, data, and the like.

The memory device 103 reads the program from the auxiliary storage device 102 and stores the program in a case where an instruction for starting the program is given. The CPU 104 executes a function relating to the prediction apparatus 10 according to the program stored in the memory device 103. The interface device 105 is used as an interface for connection to a network.

Figure 6:
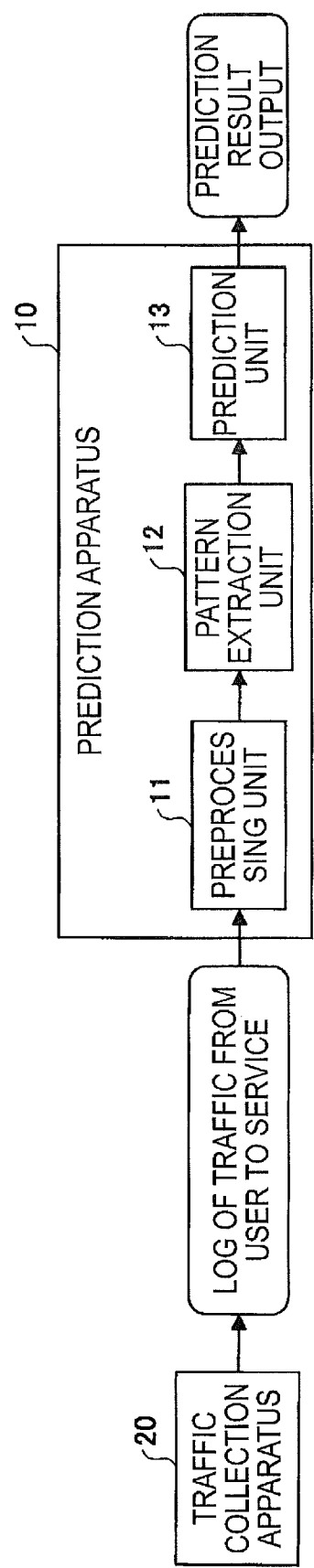
FIG. 6 is a diagram of an example of a functional configuration of the prediction apparatus 10 according to the first embodiment.

FIG. 6 is a diagram of an example of a functional configuration of the prediction apparatus 10 according to the first embodiment. In FIG. 6, the prediction apparatus 10 includes a preprocessing unit 11, a pattern extraction unit 12, and a prediction unit 13. Each of these units is realized by processing that one or more programs installed in the prediction apparatus 10 cause the CPU 104 to execute.

The preprocessing unit 11 processes the traffic logs collected by the traffic collection apparatus 20 into data in a format suitable for access pattern extraction.

The pattern extraction unit 12 receives, as input, data output from the preprocessing unit 11 and perform analysis to extract any number of representative access patterns from the input data. In addition, the pattern extraction unit 12 calculates "relevance" indicating a degree that an item of each axis of the input data relates to each of the access patterns.

The prediction unit 13 receives, as an input, the output of the pattern extraction unit 12, and outputs a result of traffic prediction for each group based on the representative access patterns.

Figure 7:
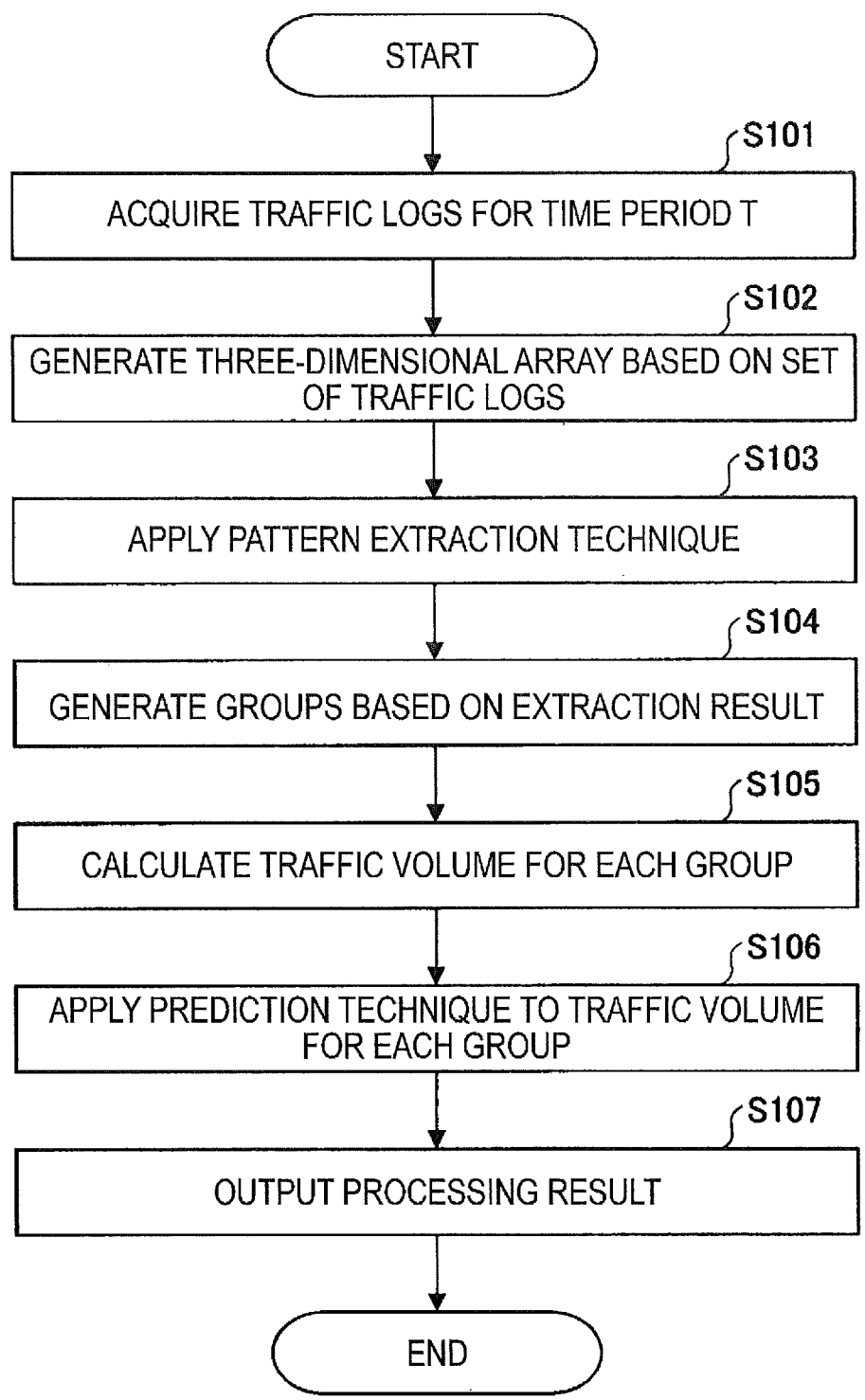
FIG. 7 is a flowchart for explaining an example of a processing procedure executed by the prediction apparatus 10 according to the first embodiment.

Hereinafter, a processing procedure executed by the prediction apparatus 10 will be described. FIG. 7 is a flowchart for explaining an example of the processing procedure executed by the prediction apparatus 10 according to the first embodiment.

In step S101, the preprocessing unit 11 acquires, from the traffic collection apparatus 20, a set of traffic logs with a timestamp included in a certain past time period T (from a prediction start time e to past (a×time width b)). Here, a and b are any numerical values set in advance by a person performing the analysis. When larger a is used, a traffic generation pattern based on traffic logs for a longer time period can be extracted. Further, b is temporal granularity of the prediction and the time is discretized with the time width b. For example, when b=1 hour, statistics of traffic described below are calculated in units of hours.

Subsequently, the preprocessing unit 11 generates (calculates), for the acquired set of traffic logs, a three-dimensional array X that represents relationship among the user IDs, the service names, and the timestamps (time zones) (statistics in units of combinations of user IDs, services, and time zones) (S102).

Figure 8:
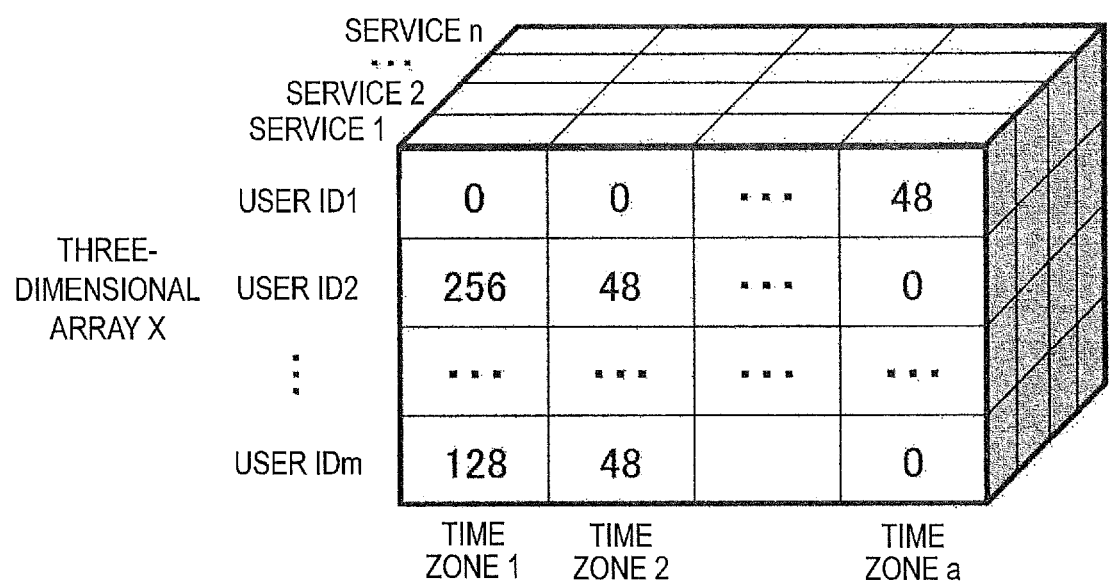
FIG. 8 is a diagram of an example of a three-dimensional array X.

FIG. 8 is a diagram of an example of the three-dimensional array X. As illustrated in FIG. 8, the three-dimensional array X has, as items of each of its axes, user IDs, service names, and time zones. The three-dimensional array X is data containing, as its elements, statistics for each of the combinations of the above-described items, which are obtained from the set of traffic logs for the combination (a method for calculating the statistics is described below). For example, a statistic v when a user ID=u, a service name=s, and a time zone=t (t is from e−b×(a−t+1) to e−b×(a−t)) may be calculated according to the method (1) or (2) described below.

(1) Extracting an access pattern based on observed values v=process(sum(observed values in traffic logs having the user ID=u and the service name=s and included in the time zone t))

(2) Extracting an access pattern based on the user ID and a usage number of service v=process(count(traffic logs having the user ID=u and the service name=s and included in the time zone t))

count( ) is the number of relevant traffic logs. sum( ) is the sum of the relevant observed values. process( ) is an operation of outputting without losing magnitude relation between input values, examples of which include process(x)=x and process(x)=log(x).

In (1), when the observed value is a traffic volume, the total value of the traffic (traffic volume) generated in each time zone for a service that has accessed by the user ID is the statistic. In (2), the number of accesses in each time zone for a service that has accessed by the user ID is the statistic. Note that, in FIG. 8, an example of a three-dimensional array generated using the method (1) is illustrated.

Subsequently, the pattern extraction unit 12 applies a pattern extraction technique to the data generated in the preprocessing unit 11 (the three-dimensional array X) (S103). By applying the pattern extraction technique, the pattern extraction unit 12 extracts, from the input data, any number of (a plurality of) representative access patterns and calculates "relevance" indicating a degree that an item of each axis of the input data relates to each of the access patterns. The pattern extraction unit 12 obtains, as output results of the pattern extraction technique, three two-dimensional arrays A, B, and C from the three-dimensional array X.

FIG. 9 is a chart of an example of the output results of the pattern extraction technique. As shown in FIG. 9, each of the two-dimensional arrays represents the relevances between the items of the corresponding axis of the three-dimensional array X and any number k of representative access patterns. From the two-dimensional array A having the time zone and the access pattern as its axes, k time-series fluctuations can be grasped. In addition, from the two-dimensional array B having the service name and the access pattern as its axes and the two-dimensional array C having the user ID and the access pattern as its axes, the service name and the user ID that can be a basis of extracting each access pattern can be grasped. Here, k is any number set in advance by a person performing the analysis.

As the pattern extraction technique, it is possible to use any technique that can receive a three-dimensional array as input and extract relation between each of the axes and patterns, such as Non-negative Tensor Factorization (NTF) and Non-negative Tucker Decomposition (NTD). As for NTF, "Welling, Max, and Markus Weber. "Positive tensor factorization." Pattern Recognition Letters 22. 12 (2001): 1255-1261." is available, for example. As for NTD, "Kim, Yong-Deok, and Seungjin Choi. "Nonnegative tucker decomposition." Computer Vision and Pattern Recognition, 2007. CVPR'07. IEEE Conference on. IEEE, 2007." is available, for example. Note that FIG. 9 is an example of output results when a traffic log is analyzed using the NTF.

Subsequently, the prediction unit 13 groups traffic based on the extracted representative access patterns (classifies traffic into groups by access pattern) (S104).

Specifically, to group traffic based on the extracted access patterns, the prediction unit 13 first performs grouping based on the users and services. The prediction unit 13 replaces each of the elements in the two-dimensional arrays B and C, which are included in the output results of the pattern extraction technique, with a label based on the relevance, and changes the axis of the pattern of each of the two-dimensional arrays B and C to an axis of the group to generate a two-dimensional array Bg and a two-dimensional array Cg as a result of the classification into groups. For example, if, among relevances for a user IDw in the two-dimensional array C, the relevance at a pattern z is the highest, then in the two-dimensional array Cg, the element of the array of the group z is set to 1 (the user IDw belongs to the group z) and the elements of the other groups are set to 0. An example of the results of labeling in this manner is shown in FIG. 10. For example, the user ID1 in the two-dimensional array C in FIG. 9 has the greatest characteristic value at the pattern 2, and thus, in the two-dimensional array Cg of FIG. 10, the element of the array of the group 2 is set to 1, and the elements of the other groups are set to 0.

Next, the prediction unit 13 calculates (aggregates) per-time-zone statistics (e.g., traffic volume or the number of accesses) for each of the groups based on the three-dimensional array X to generate a two-dimensional array Ag (group k×time zone a) as shown in FIG. 11 (S105).

FIG. 11 is a chart of an example of calculation results of per-time-zone traffic volumes for each group. For example, in the two-dimensional array Ag, the element at a time zone y of the group z is the sum of the traffic volumes generated in the time zone y for combinations of user IDs and service names p belonging to group z ($\Sigma_{w,p} g_{w,p,y}$ (where w and p belong to z, and g is an element (traffic volume) of the three-dimensional array X).

Next, the prediction unit 13 applies a prediction technique to the calculated traffic volume for each of the groups, and outputs the application result (S106).

FIG. 12 is a chart of an example of an output result A' of the prediction technique. As shown in FIG. 12, the output results (calculation results) of the prediction technique represent, in a two-dimensional array, traffic volumes (traffic prediction amounts) for each of the groups for a time period after the time period T (time zones after the time zone a). a' is the number of time zones to be predicted (prediction up to a future time of a'×b), and is any number set in advance by a person performing the analysis.

Here, as the prediction technique, any time series prediction technique, such as ARIMA model or Long Short-Term Memory (LSTM), can be applied. The prediction technique may be applied independently to each of the groups in the two-dimensional array Ag (to one-dimensional data), or may be applied at once for time-series fluctuations for a plurality of groups. As for the ARIMA model, "Feng, Huifang, and Yantai Shu. "Study on network traffic prediction techniques." Wireless Communications, Networking and Mobile Computing, 2005. Proceedings. 2005 International Conference on. Vol. 2. IEEE, 2005." is available, for example. As for LTSM, "Hochreiter, Sepp, and Jurgen Schmidhuber. "Long short-term memory." Neural computation 9.8 (1997): 1735-1780" is available, for example.

Note that the step S105 of aggregating statistics (traffic volumes) for each of the groups can be omitted. If the step S105 is omitted, the prediction unit 13 may perform the following process (hereinafter referred to as "Variation X") in step S106.

First, the prediction unit 13 applies the prediction technique (the prediction technique used in step S106) to the two-dimensional array A to obtain a two-dimensional array A″ as an output result. The two-dimensional array A″ is a two-dimensional array having, as its items, prediction values of relevance between each time zone and each group. Subsequently, the prediction unit 13 performs, based on the two-dimensional array A″ and the two-dimensional arrays B and C, inverse conversion of pattern extraction based on definition of decomposition according to the NTF. As a result of the inverse conversion, the prediction unit 13 generates a three-dimensional array X' (user IDm×service name n×time zone a') having, as its items, prediction values h of statistics in units of combinations of the items (users, services, and time zones). Subsequently, the prediction unit 13 performs inverse conversion of the statistic (inverse conversion of the process function) for each element of the three-dimensional array X' to generate a three dimensional array X″ having, as its elements, statistics prior to application of the process function. For example, when the conversion, process(x)=log(x), has been performed in the preprocessing unit 11, the element is $e^h$. Subsequently, the prediction unit 13 performs replacing of the labels (classification to groups based on the access patterns) for B and C to generate Bg and Cg as classification results. Next, the prediction unit 13 calculates a traffic volume for each group for each time zone after the time period T based on the elements of the three-dimensional array X″ and Bg and Cg, and outputs a two-dimensional array A' (group k×time zone a').

Subsequently, the prediction unit 13 outputs the processing result (S107). FIG. 13 is a chart of an example of the output of the processing result of the prediction apparatus 10. For example, in addition to the per-group traffic prediction values A' shown in FIG. 12, information Bg and Cg indicating which group each user and each service belong to are output.

Based on this result, a group-by-group control can be realized manually or automatically. For example, based on traffic prediction values of the group z, traffic of services accessed by a user ID belonging to the group z may be allocated to an optimal path. For example, a required communication quality of a representative service may be known, and based on a representative service name belonging to a group, a required communication quality for the group may be estimated. Specifically, in FIG. 13, if the service name of service 2 in the two-dimensional array Bg is update.example1.com, it is possible to estimate that the group k is a service relating to system updating and thus some delay is acceptable. In this case, if, in the time zone a+2 in the output result A', allocating the shortest path for traffic of every group may result in congestion, the group k for which huge traffic is predicted and in which some delay is acceptable may be allocated to a diversion, for example.

As described above, according to the first embodiment, it is possible to improve the accuracy of traffic prediction by grouping traffic having similar required communication quality and performing prediction in units of groups. As a result, it is possible to solve the problems in the prior art document and to contribute to control based on prediction by grasping traffic generation patterns for services and users.

Next, a second embodiment will be described. Differences from the first embodiment will be described in the second embodiment. Respects that are not particularly mentioned in the second embodiment may be the same as in the first embodiment.

Figure 14:
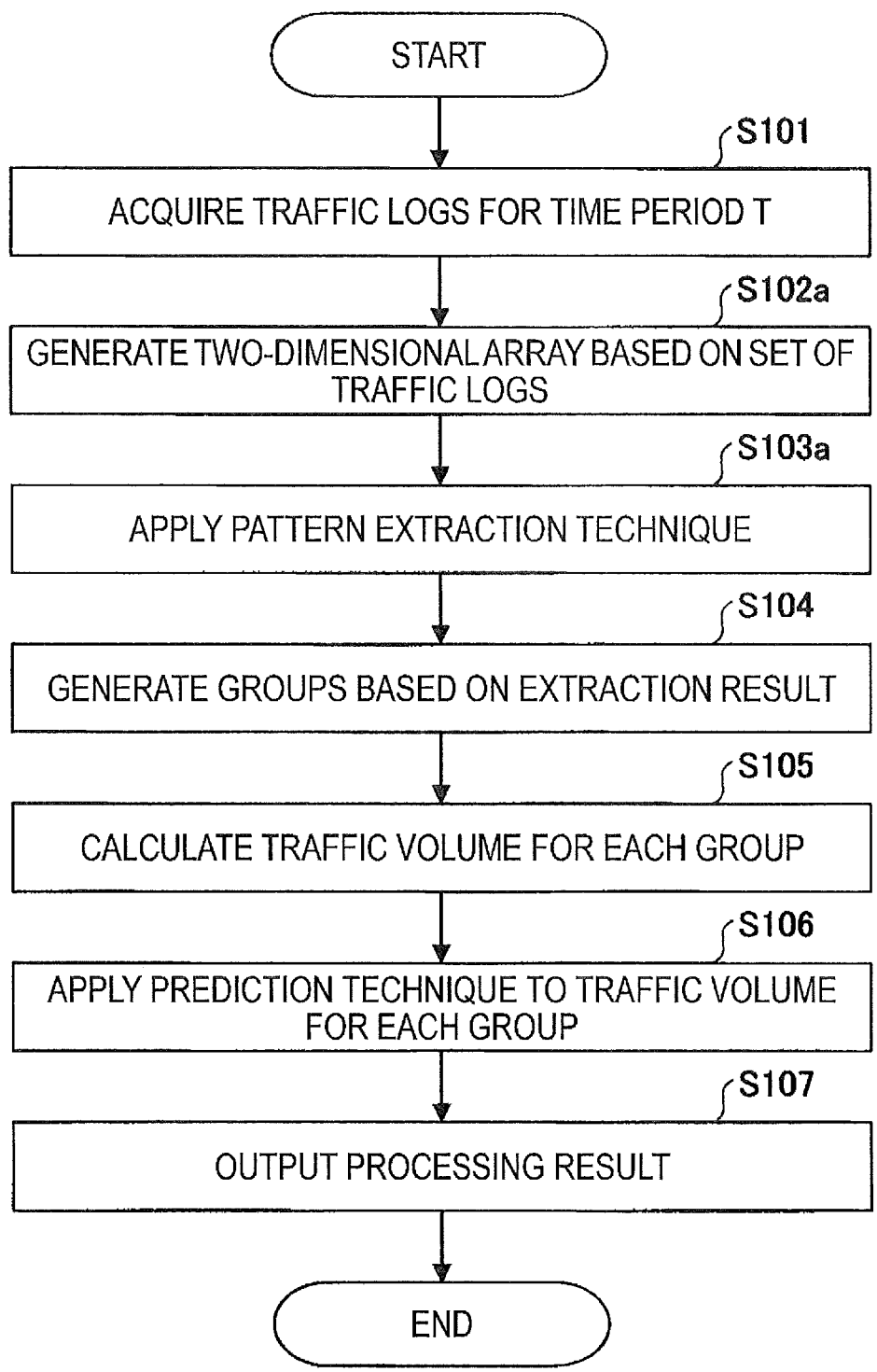
FIG. 14 is a flowchart for explaining an example of a processing procedure executed by the prediction apparatus 10 according to a second embodiment.

FIG. 14 is a flowchart for explaining an example of a processing procedure executed by the prediction apparatus 10 according to the second embodiment. In FIG. 14, the same steps as those in FIG. 7 are denoted by the same step numbers, and description thereof will be omitted. In FIG. 14, steps S102 and S103 of FIG. 7 are replaced with steps S102a and S103a, respectively.

In step S102a, the preprocessing unit 11 generates a two-dimensional array X2 (time zone×user ID or time zone×service name) for an acquired set of traffic logs.

Subsequently, the pattern extraction unit 12 applies a pattern extraction technique by using, as input data, the data generated in the preprocessing unit 11 (the two-dimensional array X2) (S103a). As an output result of the pattern extraction technique, two two-dimensional arrays, that are a two-dimensional array A and a two-dimensional array B or C, are obtained. Each of the two-dimensional arrays which are the output results represents the relevances between the items of the corresponding axis of X2 and any number k of representative access patterns (time-series fluctuations observed between users and traffic, or time-series fluctuations observed between services and traffic). In this case, it is possible to apply any pattern extraction technique that can receive a two-dimensional array as input and extract relation between items of each of the axes of the array and patterns, such as Non-negative Matrix Factorization (NMF). After application of the pattern extraction technique, the same processes as those of the first embodiment may be performed. As a result, predictions based on access patterns of the users or access patterns to services can be achieved.

Note that the second embodiment can also be applied to Variation X. As described above, steps S102, S103, and the like in FIG. 7 may be performed for at least one of users or services.

Note that, in the present embodiment, the preprocessing unit 11 is an example of a first calculation unit. The pattern extraction unit 12 is an example of an extraction unit. The prediction unit 13 is an example of a classification unit, a second calculation unit, a third calculation unit, and an inverse conversion unit.

Although the embodiments of the present disclosure have been described above in detail, the present disclosure is not limited to such specific embodiments, and various modifications or changes can be made within the scope of the gist of the present disclosure described in the claims.

REFERENCE SIGNS LIST

10 Prediction apparatus
11 Preprocessing unit
12 Pattern extraction unit
13 Prediction unit
20 Traffic collection apparatus
30 User terminal
100 Drive device
101 Recording medium
102 Auxiliary storage device
103 Memory device
104 CPU
105 Interface device
B Bus

The invention claimed is:

1. A prediction apparatus, comprising:
a processor; and
a memory that includes instructions, which when executed, cause the processor to execute the following steps:
calculating, for traffic in a past time period between a plurality of users and a plurality of services, statistics of the traffic in units of combinations of the plurality of users, the plurality of services, and time zones;
storing the calculated statistics as individual elements forming a three-dimensional array;
extracting, based on the stored statistics of the traffic, a plurality of patterns and calculating relevance between each of the plurality of patterns and at least one of each of the plurality of users or each of the plurality of services, and relevance between each of the plurality of patterns and each of the time zones, wherein the extracted plurality of patterns comprise a plurality of two-dimensional arrays;
performing inverse conversion of the extraction of the plurality of patterns, based on a result of applying a prediction technique to the calculation result of the relevance between each of the patterns and each of the time zones, and the relevance between each of the plurality of patterns and the at least one of each of the plurality of users or each of the plurality of services;
classifying, by each of the plurality of patterns, the at least one of each of the plurality of users or each of the plurality of services into groups, based on the relevance between each of the plurality of patterns and the at least one of each of the plurality of users or each of the plurality of services; and
calculating, for each of the groups, a prediction value of the statistics for a time period later than the past time period, based on the result of the inverse conversion and the result of the classification into groups.

2. A prediction method executed by a computer, the method comprising:
calculating, for traffic in a past time period between a plurality of users and a plurality of services, statistics of the traffic in units of combinations of the plurality of users, the plurality of services, and time zones;
storing the calculated statistics as individual elements forming a three-dimensional array;
extracting, based on the stored statistics of the traffic, a plurality of patterns, wherein the extracted plurality of patterns comprise a plurality of two-dimensional arrays;
calculating relevance between each of the plurality of patterns and at least one of each of the plurality of users or each of the plurality of services, and relevance between each of the plurality of patterns and each of the time zones;
performing inverse conversion of the extraction of the plurality of patterns, based on a result of applying a prediction technique to the calculation result of the relevance between each of the patterns and each of the time zones, and the relevance between each of the plurality of patterns and the at least one of each of the plurality of users or each of the plurality of services;
classifying, by each of the plurality of patterns, at least one of each of the plurality of users or each of the plurality of services into groups, based on the relevance between each of the plurality of patterns and the at least one of each of the plurality of users or each of the plurality of services; and
calculating for each of the groups, a prediction value of the statistics for a time period later than the past time period, based on the result of the inverse conversion and the result of the classification into groups.

3. The prediction method according to claim 2, wherein the classifying includes calculating relevance between each of the plurality of patterns and at least one of each of the plurality of users or each of the plurality of services, and classifying, by each of the plurality of patterns, the at least one of each of the plurality of users or each of the plurality of services into groups, based on the relevance.

4. A non-transitory storage medium for storing a program for causing a computer to execute the following:
calculating, for traffic in a past time period between a plurality of users and a plurality of services, statistics of the traffic in units of combinations of the plurality of users, the plurality of services, and time zones;
storing the calculated statistics as individual elements forming a three-dimensional array;
extracting, based on the stored statistics of the traffic, a plurality of patterns and calculating relevance between each of the plurality of patterns and at least one of each of the plurality of users or each of the plurality of services, and relevance between each of the plurality of patterns and each of the time zones, wherein the extracted plurality of patterns comprise a plurality of two-dimensional arrays;
performing inverse conversion of the extraction of the plurality of patterns, based on a result of applying a prediction technique to the calculation result of the relevance between each of the patterns and each of the time zones, and the relevance between each of the plurality of patterns and the at least one of each of the plurality of users or each of the plurality of services;
classifying, by each of the plurality of patterns, the at least one of each of the plurality of users or each of the plurality of services into groups, based on the relevance between each of the plurality of patterns and the at least one of each of the plurality of users or each of the plurality of services; and calculating, for each of the groups, a prediction value of the statistics for a time period later than the past time period, based on the result of the inverse conversion and the result of the classification into groups.

\* \* \* \* \*